(12) United States Patent
Tamai et al.

(10) Patent No.: US 6,605,341 B2
(45) Date of Patent: Aug. 12, 2003

(54) FUNCTIONAL FILM HAVING SPECIFIC SURFACE DISPERSION RATIO

(75) Inventors: Kiminori Tamai, Chuo-ku (JP); Tadayoshi Iijima, Chuo-ku (JP); Hiroshi Kawahara, Chuo-ku (JP); Yasufumi Takasugi, Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/855,663

(22) Filed: May 16, 2001

(65) Prior Publication Data

US 2002/0051879 A1 May 2, 2002

(30) Foreign Application Priority Data

May 19, 2000 (JP) .................................. 2000-148904

(51) Int. Cl.[7] ............................................. B32B 5/16
(52) U.S. Cl. .................. 428/212; 428/323; 428/328; 428/329; 428/336
(58) Field of Search ............................. 428/323, 336, 428/328, 329, 212, 218

(56) References Cited

U.S. PATENT DOCUMENTS

| | | | | |
|---|---|---|---|---|
| 4,010,291 A | * | 3/1977 | Katsube et al. | 427/126 |
| 4,336,277 A | * | 6/1982 | Bunshah et al. | 427/38 |
| 5,225,273 A | * | 7/1993 | Mikoshiba et al. | 428/323 |
| 5,698,262 A | * | 12/1997 | Soubeyrand et al. | 427/255.3 |

FOREIGN PATENT DOCUMENTS

| | | |
|---|---|---|
| JP | 04-237908 | 8/1992 |
| JP | 06-013785 | 1/1994 |
| JP | 08-199096 | 8/1996 |
| JP | 9-107195 | 4/1997 |
| JP | 09-109259 | 4/1997 |

* cited by examiner

*Primary Examiner*—H. Thi Le
(74) *Attorney, Agent, or Firm*—Oblon, Spivak, McClelland, Maier & Neustadt, P.C.

(57) ABSTRACT

An object of the present invention is to provide functional films which can exhibit a variety of functions using functional fine particles, in particular, a transparent conductive film having a low resistance value using conductive fine particles. The functional film of the present invention is a functional film comprising a support and a functional layer on at least one surface of the support, wherein the above functional layer contains functional fine particles, and a ratio ($\sigma 1/\sigma 2$) between a dispersion value ($\sigma 2$) obtainable from the alignment of the functional fine particles at the front surface of the functional layer and a dispersion value ($\sigma 1$) obtainable from the alignment of the functional fine particles at the opposite surface of the functional layer is from 1.2 to 1.85. Thereby, a sufficient contact of the functional fine particles is effected in the functional layer and the strength of the functional layer and the adhesiveness between the functional layer and the support become large, so that a transparent conductive film wherein conductive fine particles are used as the functional fine particles, for example, has a low electric resistance.

18 Claims, 2 Drawing Sheets

SURFACE SIDE

FIG·1

FUNCTIONAL FILM HAVING SPECIFIC SURFACE DISPERSION RATIO

BACKGROUND OF THE INVENTION

The present invention relates to a functional film. In the present invention, the functional film is defined as follows. That is, the functional film means a film having a function, and the function means an action exhibited through a physical and/or chemical phenomenon. The functional film includes films having various functions such as a conductive film, a magnetic film, a ferromagnetic film, a dielectric film, a ferroelectric film, an electrochromic film, an electroluminescence film, an insulating film, a light-absorption film, a light-selective-absorption film, a reflection film, an antireflection film, a catalyst film, and a photocatalyst film.

In particular, the present invention relates to a transparent conductive film. The transparent conductive film can be used as a transparent electrode such as an electrode for an electroluminescence panel, an electrode for an electrochromic device, an electrode for a liquid crystal display, a transparent planar heating element, or a touch panel, and also as a transparent electromagnetic wave-shielding film.

Heretofore, functional films comprising a variety of functional materials have been produced by a physical vapor deposition (PVD) such as vacuum deposition, laser-abrasion, sputtering, or ion plating, or a chemical vapor deposition (CVD) such as thermal CVD, light CVD, or plasma CVD. These methods generally require huge facilities and some of them are not suitable for the formation of a film of a large area.

Furthermore, the film formation by coating using a sol-gel method is also known. The sol-gel method is also suitable for the formation of a film having a large area, but in most cases, it is necessary to sinter an inorganic material at a high temperature after the coating.

For example, the production of the transparent conductive film is as follows. Currently, the transparent conductive film is mainly produced by a sputtering method. There are a variety of sputtering procedures. One example is a method of forming a transparent conductive layer by acceleration-bombarding inert gas ions generated by direct current or high-frequency discharge in vacuum to a target surface, beating the atoms constituting the target out of the surface, and depositing them onto a support surface.

The sputtering method is advantageous because a transparent conductive film having a low surface electric resistance can be formed even when the film is large to some degree. However, the method has defects that the apparatus is large and the film formation is slow. When a transparent conductive film having a larger area is required in future, the apparatus should be larger. This requirement results in the necessity of enhanced accuracy on control as a technical problem, and also results in the problem of increase of production cost in another aspect. Furthermore, for compensating the slow film formation, the formation is accelerated by increasing the number of the target, but the increase is problematic because it also makes the apparatus larger.

The production of the transparent conductive film is also attempted by an coating method. A conventional coating method comprises applying a conductive coating composition, wherein conductive fine particles are dispersed in a binder solution, onto a resin film, and drying and hardening the composition to form a transparent conductive film. The coating method is advantageous because a transparent conductive film having a large area can be easily formed, the apparatus is simple, productivity is high, and the transparent conductive film can be produced at a cost lower than that in the sputtering method. In the transparent conductive film formed by the coating method, conductivity is expressed by the formation of an electric pathway owing to the mutual contact of the conductive fine particles. However, the transparent conductive film prepared by the conventional coating method has a defect that the contact of the conductive fine particles is insufficient owing to the presence of the binder and thus the resulting transparent conductive film has a high electric resistance (inferior conductivity), so that the use is limited.

As a production of a transparent conductive film by the conventional coating method, Japanese Patent Application Laid-Open No. 109259/1997 discloses a process for producing the film comprising a first step of forming a conductive layer by applying a coating composition comprising conductive powder and a binder resin onto a plastic film for transcription and drying the coated film, a second step of pressing the surface of the conductive layer to a smooth plane (5 to 100 kg/cm$^2$) and heating the surface (70 to 180° C.), and a third step of laminating the conductive layer on a plastic film or sheet and fixing them by applying pressure under heating.

In this method, a conductive film having a low electric resistance is not obtained because of the use of a large amount of the binder resin (100 to 500 parts by weight of conductive powder relative to 100 parts of the binder in the case of inorganic conductive powder; 0.1 to 30 parts by weight of conductive powder relative to 100 parts of the binder in the case of organic conductive powder).

Further, Japanese Patent Application Laid-Open No. 199096/1996 discloses a method of applying a coating composition for forming a transparent conductive film comprising tin-doped indium oxide (ITO) powder, a solvent, a coupling agent, and an organic or inorganic acid salt of a metal but containing no binder onto a glass plate, and sintering it at a temperature of 300° C. or higher. In this method, the electric resistance of the conductive film is low because of no use of binder. However, since it is necessary to conduct the sintering step at a temperature of 300° C. or higher, it is difficult to form a conductive film on a support such as a resin film. That is, a resin film is melted, carbonized, or fired at the high temperature. The temperature limit may depend on the kind of the resin films and, for example, it may be 130° C. for polyethylene terephthalate (PET) film.

As a conductive film formed by other method than the coating method, Japanese Patent Application Laid-Open No. 13785/1994 discloses a conductive film comprising a powder-compressed layer where at least part of, preferably all of the voids of skeleton structure constituted by conductive material (metal or alloy) powder are filled with a resin, and a resin layer present under the layer. The method of the production will be explained by exemplifying the case of forming a film on a plate material. According to the above patent publication, a resin, a powdery material (metal or alloy) and a plate material which is a member to be treated are first shaken or stirred in a vessel together with a film-forming medium (steel balls having a diameter of several millimeter) to form a resin layer on the surface of the member to be treated. Successively, the powdery material is trapped and fixed in the resin layer by the adhesive action of the resin layer. Further, the film-forming medium shaken or stirred imparts an impact force to the powdery material shaken or stirred to form a powder-compressed layer. However, for obtaining a fixing effect of the powder-compressed layer, a considerable amount of the resin is required. Moreover, the process is more complicated than the case of the coating method.

As another conductive film formed by a method other than the coating method, Japanese Patent Application Laid-Open No. 107195/1997 discloses a conductive fiber-resin integrated layer obtained by depositing a conductive short fiber on a film of PVC and the like through sprinkling the fiber, followed by pressurization. The conductive short fiber is a short fiber such as polyethylene terephthalate subjected to a covering treatment such as nickel plating. The pressurizing operation is, however, preferably conducted under a temperature condition at which the resin matrix layer shows thermoplasticity and thus, conditions of a high temperature and a low pressure such as 175° C. and 20 kg/cm$^2$ are required, so that it is difficult to form a conductive film on a support such as a resin film.

In consideration of such circumstances, it is desired to develop a functional film capable of forming easily a film having a large area, which can be prepared using a simple apparatus with high productivity and low cost, as well as has a high quality.

In particular, for a conductive film, it is desired to develop a conductive film capable of forming easily a film having a large area, which can be prepared using a simple apparatus with high productivity and low cost, as well as has a high quality.

SUMMARY OF THE INVENTION

An object of the present invention is to provide functional films which can exhibit a variety of functions using functional fine particles.

In particular, an object of the present invention is to provide a conductive film having a low resistance value using functional fine particles.

For achieving such an object, the functional film of the present invention is constituted by a functional film comprising a support and a functional layer on at least one surface of the support, wherein the above functional layer contains functional fine particles, and a ratio ($\sigma 1/\sigma 2$) between a dispersion value ($\sigma 2$) obtainable from the alignment of the functional fine particles at the front surface of the functional layer and a dispersion value ($\sigma 1$) obtainable from the alignment of the functional fine particles at the opposite surface of the functional layer is from 1.2 to 1.85.

As a preferred aspect of the functional film, it has a constitution wherein the above support is a transparent resin film.

As a preferred aspect of the functional film, it has a constitution wherein the above functional fine particles are conductive fine particles.

As a preferred aspect of the functional film, it has a constitution wherein average primary particle size of the above conductive fine particles is in the range of 5 to 50 nm.

As a preferred aspect of the functional film, it has a constitution wherein the thickness of the above functional layer is in the range of 0.5 to 5 μm.

Further, as a preferred aspect of the functional film, it has a constitution wherein the above functional layer contains a resin in an amount of the range of 3.7 by volume or less when the volume of the above conductive fine particles is regarded as 100.

According to the present invention as above, the functional film comprising a functional layer on at least one surface of a support is a film wherein the above functional layer contains functional fine particles, and a ratio ($\sigma 1/\sigma 2$) between a dispersion value ($\sigma 2$) obtainable from the alignment of the functional fine particles at the front surface of the functional layer and a dispersion value ($\sigma 1$) obtainable from the alignment of the functional fine particles at the opposite surface of the functional layer is 1.2 or more, so that a sufficient contact of the functional fine particles is effected in the functional layer and therefore, the strength of the functional layer and the adhesiveness between the functional layer and the support become large. Accordingly, a transparent conductive film wherein conductive fine particles are used as the functional fine particles, for example, has a low electric resistance. Moreover, the adhesiveness between the support and the functional layer is strong enough to use it for a long period of time. Furthermore, it is also possible to use a transparent support such as a transparent resin film as the support, and the functional film of the present invention can be formed as a film having a large area by changing a coating apparatus or a compressing apparatus.

DETAILED DESCRIPTION OF PREFERRED EMBODIMENTS

The following will explain modes for carrying out the present invention.

The functional film of the present invention is a functional film comprising a functional layer on at least one surface of a support, wherein the functional layer contains functional fine particles, and a ratio ($\sigma 1/\sigma 2$) between a dispersion value ($\sigma 2$) obtainable from the alignment of the functional fine particles at the front surface of the functional layer and a dispersion value ($\sigma 1$) obtainable from the alignment of the functional fine particles at the opposite surface of the functional layer is from 1.2 to 1.85.

The following will explain the present invention by exemplifying a transparent conductive film which is one embodiment of the functional film of the invention. By the way, in the present invention, "transparent" means to transmit a visible light. The level of the degree of light scattering required varies with the applications of the transparent conductive film.

The transparent conductive film which is a functional film of the present invention comprises a transparent conductive layer as the functional layer on a transparent support.

The transparent conductive layer constituting the transparent conductive film contains conductive fine particles as the functional fine particles, and a ratio ($\sigma 1/\sigma 2$) between a dispersion value ($\sigma 2$) obtainable from the alignment of the functional fine particles at the front surface of the transparent conductive layer and a dispersion value ($\sigma 1$) obtainable from the alignment of the functional fine particles at the opposite surface of the transparent conductive layer is from 1.2 to 1.85. In the present invention, the above dispersion values $\sigma 1$ and $\sigma 2$ are defined as follows. That is, the alignment of the conductive fine particles at the opposite side of the front surface of the transparent conductive layer at the cross sectional photograph of 100 thousand magnifications of the transparent conductive film and the alignment of the conductive fine particles at the front side are each traced. For the resulting two kinds of lines showing aligning states of the conductive fine particles, the distance from a base line was measured at plural points and the average squares of differences between the average of the measured values and each measured value are defined as σ1 and σ2.

Figure 1:
FIG. 1 is a drawing illustrating one example of a cross sectional photograph of 100 thousand magnifications of a transparent conductive film which is one embodiment of the functional film of the present invention.
Figure 2:
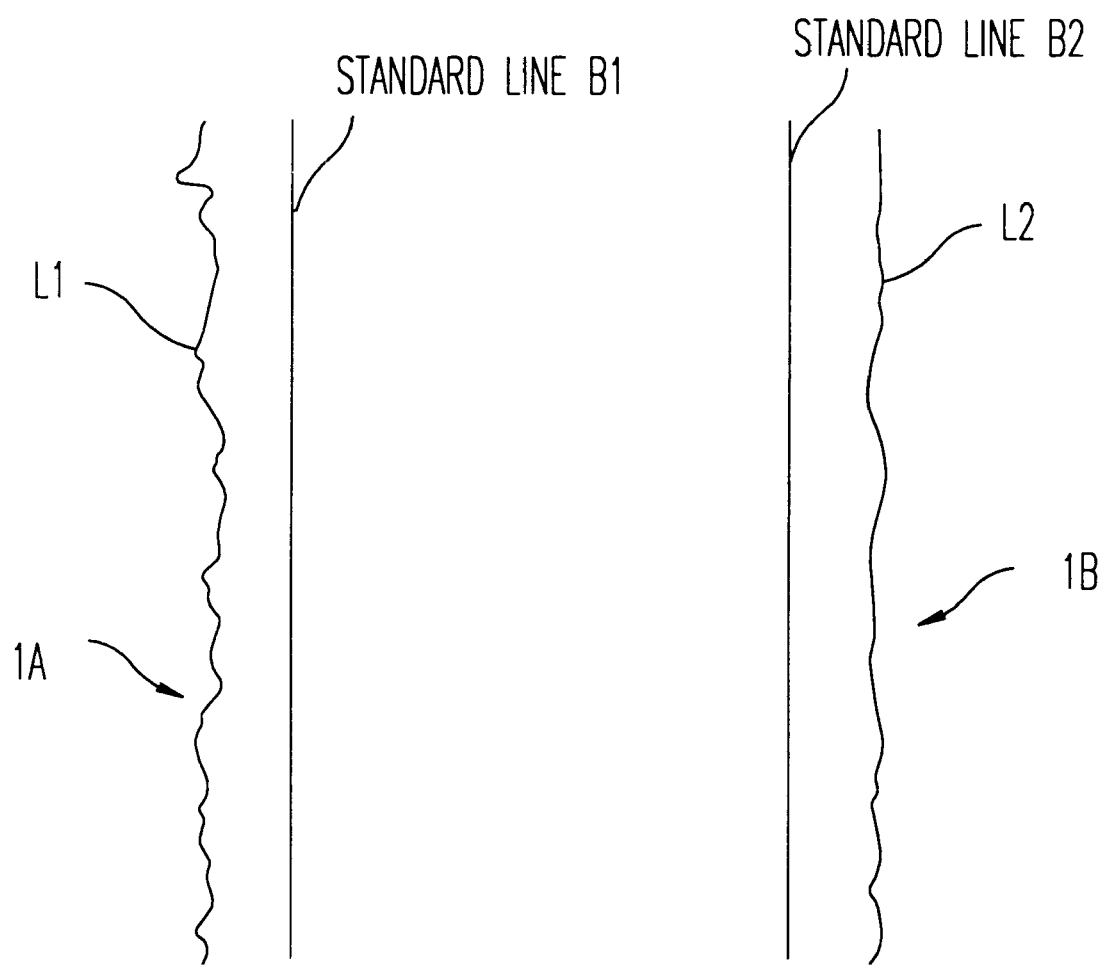
FIG. 2 is a drawing for the explanation of the procedure for obtaining the dispersion values, $\sigma 1$, $\sigma 2$, from the lines showing the alignments of the conductive fine particles at the front surface and the opposite surface of a transparent conductive layer.

This requirement will be explained in detail with reference to FIGS. 1 and 2. First, a squared tracing paper is placed on the cross sectional photograph of 100 thousand magnifications of the transparent conductive film (FIG. 1) without deviation, and the end surface at which the conductive fine particles at the opposite side (Side 1A in FIG. 2) of the front surface of the transparent conductive layer are aligned and the end surface at which the conductive fine particles at the front side (Side 1B in FIG. 2) of the transparent conductive layer are aligned are each traced to obtain lines L1 and L2 showing aligning states of the conductive fine particles. By the way, since the part where the conductive fine particles are apparently lacked affects the measurement, a line segment is obtained at the lacking part by extrapolating from both side of the lacking part. Then, base line B1 and B2 are drawn at about 1 cm apart from each of the lines L1 and L2 showing aligning states of the conductive fine particles. And, the distances between the base line B1 and the line L1 showing an aligning state of the conductive fine particles are measured at an interval of 1 to 2 mm (the measuring length are 10 cm or more), and the average square of the differences between the average value of the measured values and each measured value is defined as the dispersion value σ1. Similarly, the distances between the base line B2 and the line L2 showing an aligning state of the conductive fine particles are measured at an interval of 1 to 2 mm, and the average square of the differences between the average value of the measured values and each measured value is defined as the dispersion value σ2. Thereafter, the ratio (σ1/σ2) of the dispersion value σ1 to the dispersion value σ2 is calculated.

The transparent conductive layer which has the ratio (σ1/σ2) of the dispersion value σ1 to the dispersion value σ2 of 1.2 to 1.85 is realized only at the state wherein the constituting conductive fine particles are embedded in the transparent support. In the conventional transparent conductive films, the opposite side of the transparent conductive layer are smooth surfaces which directly reflect the smooth surface of the transparent support, and there is no transparent conductive layer having the ratio (σ1/σ2) of 1.2 or more. When the ratio (σ1/σ2) is less than 1.2, the mutual contact of the conductive fine particles becomes insufficient and it is difficult to obtain a transparent conductive layer excellent in conductivity. Moreover, the strength of the transparent conductive layer is low and the adhesiveness to the transparent support becomes also insufficient. On the other hand, though higher ratio of σ1/σ2 is preferred, a high compressing force is required in the formation of the transparent conductive layer and thus pressure resistance of the compressing apparatus should be raised, so that the ratio up to 1.85 is generally suitable.

As the conductive fine particles constituting the above transparent conductive layer, known inorganic conductive fine particles can be used without limitation unless they impair the transparency of the transparent conductive film.

The inorganic conductive fine particles includes tin oxide, indium oxide, zinc oxide, cadmium oxide, and the like, and fine particles of antimony-doped tin oxide (ATO), fluorine-doped tin oxide (FTO), tin-doped indium oxide (ITO), aluminum-doped zinc oxide (AZO), and the like are preferred. Further preferred is ITO because it results in more excellent conductivity. Alternatively, those obtained by coating the surface of the fine particles having transparency such as barium sulfate with an inorganic material such as ATO or ITO can be also used.

The average primary particle size of these conductive fine particles is 300 nm or less, preferably 100 nm or less, more preferably in the range of 5 to 50 nm. When the average primary particle size of the conductive fine particles exceeds 300 nm, there is a high possibility that the balance of properties of the transparent conductive layer is impaired, and thus the case is not preferred.

The thickness of the transparent conductive layer comprising the above conductive fine particles may be in the range of 0.1 to 10 μm, preferably 0.5 to 5 μm. The electric resistance of the transparent conductive layer can be optionally determined depending on the applications of the transparent conductive film.

In the present invention, the transparent conductive layer constituting the transparent conductive film may contain a minute amount of a resin unless it increases the electric resistance. For example, when the volume of the above conductive fine particles is regarded as 100, the resin can be incorporated to the transparent conductive layer in an amount of less than 25, preferably less than 20, more preferably 3.7, by volume. More preferred is to incorporate no resin to the transparent conductive layer. The resin has a function of reducing light scattering but causes an increase of the electric resistance of the transparent conductive film. This is because the mutual contact of the conductive fine particles is inhibited by the insulating resin and, in the case of a large amount of the resin, the conductive fine particles do not come into contact with each other, so that the electron transfer among the fine particles is inhibited. Accordingly, in consideration of the improving haze degree and securing the conductivity among the conductive fine particles, the resin may be used within the above volume range, if incorporated. Within the range of the resin amount, the amount of the resin is small and thus, most of the resin is considered to exist in the void of the conductive fine particles.

As the above resin, thermoplastic resins or polymers having a rubber elasticity excellent in transparency can be used solely or in combination of two or more without limitation. Examples of the resin include fluorine polymers, silicone resins, acrylic resins, polyvinyl alcohol, carboxymethyl cellulose, hydroxypropyl cellulose, regenerated cellulose diacetyl cellulose, polyvinyl chloride, polyvinyl pyrrolidone, polyethylene, polypropylene, SBR, polybutadiene, polyethylene oxide, and the like.

The fluorine polymers include polytetrafluoroethylene, polyvinylidene fluoride (PVDF), vinylidene fluoride-ethylene trifluoride copolymer, ethylene-tetrafluoroethylene copolymer, propylene-tetrafluoroethylene copolymer, and the like. In addition, fluorine-containing polymers obtainable by substituting the hydrogen of the main chain with an alkyl group may be also used. The larger the density of the resin is, the easier it is to satisfy the above volume requirement, since the volume is smaller even when a large weight of the resin is used.

By the way, the volume of the above conductive fine particles and the volume of the resin are not apparent volumes but real volumes. Real volume is determined by determining density using an instrument such as pycnometer in accordance with JIS Z 8807 and dividing the weight of the material to be used by the density. The reason why the amount of the resin to be used is defined by not the weight but the volume is because the situation is more clearly reflected when it is considered how the resin exists relative to the conductive fine particles in the transparent conductive layer.

As the transparent support constituting the transparent conductive film of the present invention, a variety of materials such as a resin film and glass can be used. Thereby, the transparent conductive layer is well adhered to the transparent support as if part of the conductive fine particles which are into contact with the transparent support are embedded in the transparent support. In the case that a material having a larger hardness than that of the conductive fine particles, e.g., a material having a large hardness such as glass or a rein film having a hard surface, is used as the transparent support, a transparent support where a resin layer having a smaller hardness than that of the conductive fine particles is formed beforehand on the hard glass surface or hard film surface is used. Thereby, the conductive fine particles are embedded in the resin layer, and thus the adhesiveness between the transparent conductive layer and the transparent support becomes sufficient.

By the way, after the formation of the transparent conductive layer, the resin layer having a small hardness may be hardened by heat or ultraviolet ray. The resin layer is preferably a substance which is not dissolved in the liquid in which the conductive fine particles are dispersed. When the resin is dissolved, the solution containing the above resin comes periphery of the conductive fine particles by capillary action, and as a result, the electric resistance increases. Also, after the formation of the transparent conductive layer, the resin layer can be peeled off the glass surface or the hard film surface to form a transparent conductive film comprising a transparent resin layer as the transparent support.

The above resin layer may be formed by one or two or more of thermoplastic resins or polymers having a rubber elasticity excellent in transparency. Examples of the resin include fluorine polymers, silicone resins, acrylic resins, polyvinyl alcohol, carboxymethyl cellulose, hydroxypropyl cellulose, regenerated cellulose diacetyl cellulose, polyvinyl chloride, polyvinyl pyrrolidone, polyethylene, polypropylene, SBR, polybutadiene, polyethylene oxide, and the like.

In the case of using a non-flexible material such as glass or ceramic, attention should be paid because there is a high possibility that the material may be broken during the process. Therefore, the transparent support is preferably a resin film which is not broken. The resin film is also preferable, as mentioned below, in view of the good adhesion to the transparent conductive layer comprising the conductive fine particles and is suitable for the applications wherein weight saving is required. Accordingly, in the case that the use at a high temperature is not intended, the resin film can be used as the transparent support.

Examples of the resin film include films of polyesters such as polyethylene terephthalate (PET), films of polyolefins such as polyethylene and polypropylene, polycarbonate films, acrylic films, norbornene film (Arton manufactured by JSR K.K.), and the like.

By the way, the transparent support having haze of the range of 0.5 to 5% can be used depending on the applications.

In the present invention, it is also possible to form a transparent conductive film comprising transparent conductive layers at both surfaces of a transparent support.

The next will explain one example of the method for producing the transparent conductive film of the present invention.

The transparent conductive layer constituting the transparent conductive film can be formed by applying a dispersion containing conductive fine particles and optional minute amount of a resin as a conductive coating composition onto a transparent support and drying the whole, followed by compression.

As a liquid for dispersing the conductive fine particles, in the case that the conductive coating composition contains a resin, known various solvents can be used without limitation as far as the resin is dissolved in the solvents. Examples of the solvents include saturated hydrocarbons such as hexane; aromatic hydrocarbons such as toluene and xylene, alcohols such as methanol, ethanol, propanol, and butanol; ketones such as acetone, methyl ethyl ketone, methyl isobutyl ketone, and diisobutyl ketone; esters such as ethyl acetate and butyl acetate; ethers such as tetrahydrofuran, dioxane, and diethyl ether; amides such as N,N-dimethylformamide, N-methylpyrrolidone (NMP), and N,N-dimethylacetamide; halogenated hydrocarbons such as ethylene chloride and chlorobenzene; and the like. Among them, polar solvents are preferred, and alcohols such as methanol and ethanol and amides such as NMP are suitable. These solvents can be used solely or in combination of two or more. Furthermore, a dispersing agent may be used for improving the dispersibility of the conductive fine particles.

Moreover, water is also usable as the solvent. In the case of using water, the transparent support should be hydrophilic. The above resin layer or resin film is usually hydrophobic and thus tends to repel water, so that it is difficult to obtain a uniform film. In the case that the surface of the transparent support comprises a resin layer, or in the case that the transparent support is a resin film, it is necessary to mix water with an alcohol, or to make the surface of the support hydrophilic. By the way, when the conductive coating composition contains a resin, it is preferable to consider the solubility of the resin, too.

The amount of the solvent to be used is not particularly limited and may be determined so that the dispersion of the conductive fine particles has a viscosity suitable for coating. For example, relative to 100 parts by weight of the conductive fine particles, the amount may be about 100 to 100000 parts by weight of liquid. The amount of the solvent may be optionally selected depending on the kinds of the conductive fine particles and the liquid.

The dispersing of the conductive fine particles into the liquid can be conducted by a known dispersing method. For example, they are dispersed by sand grinder mill process. At the dispersion, it is also preferable to use media such as zirconia beads for raveling agglomerated conductive fine particles. At the dispersion, attention should be paid so that the contamination of impurities such as dust does not occur.

The dispersion of the above conductive fine particles may be blended with various additives within the range where the conductivity is not decreased. Examples thereof include additives such as UV absorber, surfactant, and dispersing agent.

The dispersion of the conductive fine particles can be applied onto the transparent support by a known method without particular limitation. For example, it can be effected by coating methods such as reverse roll method, direct roll method, blade method, knife method, extrusion nozzle method, curtain method, gravure roll method, bar coat method, dipping method, kiss coat method, and squeeze method. In addition, the dispersion can be attached onto the transparent support by atomization, spraying, and the like.

The drying temperature varies depending on the kind of the liquid used for the dispersion, but is preferably from about 10° C. to about 150° C. When the temperature is lower than 10° C., the moisture in the air tends to condense and at higher than 150° C., the resin film support is deformed. Moreover, attention should be paid so that impurities do not attach to the surface of the conductive fine particles at drying.

The thickness of the conductive fine particles-containing layer after coating and drying depends on the compressing conditions of the next step and the applications of the transparent conductive film, but may be from about 0.1 µm to about 10 µm.

As mentioned above, a uniform film is easily prepared by dispersing the conductive fine particles in the liquid, applying the dispersion and drying. When the dispersion of the conductive fine particles is applied and dried, the fine particles form a film even when a large amount of binder resin as in a conventional method is not present in the dispersion, that is, the resin is not incorporated or the amount of the resin is less than a specific amount as in the present invention. The reason why a film is formed even under absence of a large amount of the binder resin is not exactly clear, but it is considered that the fine particles is gathered by capillary action when the amount of the liquid becomes small through drying, and the fine particles have a large specific surface area and a strong cohesive force, thereby the film being formed. However, the film at this stage has the ratio (σ1/σ2) of the dispersion value σ1 to the dispersion value σ2 of less than 1.2, and therefore, the strength is weak. Also, it has a high electric resistance as a transparent conductive layer and the values of the electric resistance vary widely.

Next, the conductive fine particles-containing layer formed is compressed to obtain a compressed layer of the conductive fine particles. By the compression, the situation as if the conductive fine particles are embedded in the transparent support is realized and the ratio (σ1/σ2) of the dispersion value σ1 to the dispersion value σ2 becomes 1.2 or more. Thereby, the decrease of the electric resistance and the enhancement of the film strength are achieved. That is, the contacting points among the conductive fine particles are increased by the compression and thus the contacting area is increased. Accordingly, the electric resistance decreases and the coating film is strengthened. Since the fine particles have naturally a nature of being apt to agglomerate, the compression affords a strong film. Also, the compression decreases haze degree.

The compression is preferably carried out under a compressing force of 44 N/mm² or more. When the force is less than 44 N/cm², the conductive fine particles-containing layer cannot be compressed sufficiently and thus it is difficult to obtain a transparent conductive layer excellent in conductivity. The compressing force of 180 N/mm² or more is more preferred for the compression. A transparent conductive layer having superior conductivity is obtained by higher compressing force, thereby the strength of the transparent conductive layer is enhanced and the adhesion to the transparent support is strengthened. Since a higher compressing force requires an increased pressure resistance of the apparatus, the compressing force up to 1000 N/mm² is generally suitable.

Furthermore, it is preferred to carry out the compression at around ordinary temperature (15 to 40° C.). When the compression is carried out under heating conditions (hot pressing), there occurs inconvenience that the resin film is expanded under an increased compressing pressure.

The compressing means is not particularly limited, and sheet pressing, roll pressing, and the like can be applied. The compression is preferably carried out using a roll-pressing machine. The roll pressing is a process wherein a film to be compressed is compressed by interposing it between two rolls, and the rolls are rotated. The roll pressing is suitable because a high pressure can be applied evenly and productivity is high owing to the capability of roll-to-roll production.

The roll temperature of the roll-pressing machine is preferably ordinary temperature. Under a heated atmosphere or at the compression wherein the rolls are heated (hot-pressing), there occurs inconvenience that the resin film is expanded under an increased compressing pressure. When the compressing pressure is reduced in order to prevent the expansion of the resin film under heating, the mechanical strength of the transparent conductive layer decreases and the electric resistance increases. In the case that it is desired to reduce the moisture attached to the fine particle surface as far as possible, the atmosphere may be heated for lowering the relative humidity of the atmosphere but the temperature should be within the range where the film is not easily expanded. In general, the range is equal to or lower than glass transition temperature (secondary transition temperature). In consideration of the variation of humidity, the temperature may be set at a temperature slightly higher than the temperature at which required humidity is attained. In the case of continuous compression using a roll-pressing machine, it is preferable to regulate the temperature so that the roll temperature does not increase owing to heat generation. By the way, the glass transition temperature of a resin film is determined through measuring dynamic viscoelasticity, and indicates the temperature at which mechanical loss of primary dispersion reaches its peak. For example, the glass transition temperature of PET film is about 110° C.

A metal roll is suitable for the roll of the roll-pressing machine since a strong pressure can be applied. In addition, it is preferable to form a hard film on the surface of the roll because the conductive fine particles may be transcribed to the roll at the compressing when the roll surface is soft.

As mentioned above, the transparent conductive film of the present invention comprising a transparent conductive layer is obtained by forming a compressed layer of the conductive fine particles. The thickness of the transparent conductive layer varies depending on the applications, but may be about 0.1 to 10 µm, as mentioned above. Furthermore, for obtaining a thick transparent conductive layer of about 10 µm, a series of the operations of applying, drying and compressing of the dispersion of the conductive fine particles may be repeated. By the way, in the case that a functional layer where the same functional layers are laminated is obtained by repeating the same operations, the outermost surface of the lamination is regarded as the surface to be measured. Also, in the case that a functional layer where different functional layers are laminated is obtained, the outermost surface of the lamination is regarded as the surface to be measured.

The transparent conductive film of the present invention thus obtained exhibits an excellent conductivity at its transparent conductive layer, has practically enough film strength although it is formed by no use of a conventional large amount of binder resin, and is excellent in adhesiveness to the transparent support.

In the above embodiment, a transparent conductive film is mentioned as a functional film, but the functional film of the present invention includes, without limitation, films having various functions such as a conductive film, a magnetic film, a ferromagnetic film, a dielectric film, a ferroelectric film, an electrochromic film, an electroluminescence film, an insulating film, a light-absorption film, a light-selective-absorption film, a reflection film, an antireflection film, a catalyst film, and a photocatalyst film. Therefore, in the present invention, functional fine particles constituting the above aimed film are used. The functional fine particles are not particularly limited, and mainly inorganic fine particles having a cohesive force are used. In any functional film of the present invention, a functional layer having an enough mechanical strength is obtained and also problems caused by a binder resin in the conventional coating method using a large amount of the binder resin can be solved. As a result, an enhanced objective function is exhibited.

Other than the above transparent conductive film, in the ferromagnetic film, for example, oxide-type magnetic powder such as $\gamma$-$Fe_2O_3$, $Fe_3O_4$, Co—$FeO_x$, and Ba ferrite; ferromagnetic alloy powder mainly composed of ferromagnetic metal element(s) such as $\alpha$-Fe, Fe—Co, Fe—Ni, Fe—Co—Ni, Co, and Co—Ni; and the like are used, and the saturation magnetic flux density of a magnetic coated film which is a functional layer is enhanced.

In the dielectric film and ferroelectric film, fine particles of dielectric substances or ferroelectric substances such as magnesium titanate, barium titanate, strontium titanate, lead titanate, lead zirconate titanate (PZT), lead zirconate, lanthanum-added lead zirconate titanate (PLZT), magnesium silicate, and lead-containing perovskite compounds are used. In the dielectric film and ferroelectric film of the present invention, the improvement of dielectric properties or ferroelectric properties is obtained.

Furthermore, in the metal oxide films expressing various functions, fine particles of metal oxides such as iron oxide ($Fe_2O_3$), silicon oxide ($SiO_2$), aluminum oxide ($Al_2O_3$), titanium dioxide ($TiO_2$), titanium oxide (TiO), zinc oxide (ZnO), zirconium oxide ($ZrO_2$), and tungsten oxide ($WO_3$) are used. In the metal oxide films of the present invention, each function is improved because of increased packing density of the metal oxide in each functional layer. For example, in the case of using $SiO_2$ or $Al_2O_3$ on which a catalyst is supported, a porous catalyst film having a practical strength is obtained. In the case of using $TiO_2$, a photocatalytic function is improved. Further, in the case of using $WO_3$, coloring action is improved in an electrochromic display device.

Moreover, in the electroluminescence film, zinc sulfide (ZnS) fine particles are used. The electroluminescence film of the present invention can be an inexpensive film obtainable by coating method.

The particle size, r, of the functional fine particles varies depending on the applications, for example, required degree of scattering and the like, and also depends on the shape of the particles, but in general, average primary particle size, r is 10 $\mu$m or less, preferably 1.0 $\mu$m or less, more preferably from 5 nm to 100 nm.

The following will explain the present invention in detail with reference to Examples, but the invention is not limited these Examples.

EXAMPLE 1

First, 300 parts by weight of ethanol was added to 100 parts by weight of ATO fine particles having average primary particle size of 20 nm (SN-100P manufactured by Ishihara Sangyo K.K.), and the particles were dispersed in a dispersing machine using zirconia beads as media to prepare a conductive coating composition.

Next, the above conductive coating composition was applied onto a PET film (a thickness of 50 $\mu$m) using a bar coater and dried at 50° C. Hereinafter, the resulting film was referred to as a pre-compression ATO film. The thickness of the ATO-containing coated film was 2.2 $\mu$m.

Then, the pre-compression ATO film was interposed between metal rolls (the roll surfaces were subjected to a hard chromium-plating treatment), and was compressed by rotating the rolls at room temperature (23° C.) at a feeding rate of 5 m/minute. The compressing pressures per unit area at the compressing step were set differently as shown in following Table 1. Transparent conductive films (Samples 1 to 6) comprising each transparent conductive layer were obtained by compressing the ATO films in such a manner.

Moreover, 100 parts by weight of the same ATO powder as above was added to a resin solution obtained by dissolving 100 parts by weight of an acrylic resin solution MT408-42 (non-volatile component concentration of 50%) manufactured by Taisei Kako K.K. as a resin into 400 parts by weight of a methyl ethyl ketone/toluene/cyclohexanone (1:1:1) mixed solution, and the powder was dispersed in a dispersing machine using zirconia beads as media to prepare a conductive coating composition. Using the conductive coating composition, a transparent conductive film (Sample 7) was obtained in a similar manner to the above transparent conductive films (Samples 1 to 6). However, the compressing pressure per unit area at the compressing step was set as shown in following Table 1.

Furthermore, a transparent conductive film (Sample 8) was obtained in a similar manner to the above transparent conductive film (Sample 3: no resin was used) with the exception that a silicon resin hard coat material of a thickness of 3 $\mu$m (Tosguard 510 manufactured by GE Toshiba silicone K.K.) placed on the above PET film was used as a transparent support.

For the eight kinds of the transparent conductive films (Samples 1 to 8), the thickness of the transparent conductive layer after the compression was measured, and the ratio ($\sigma 1/\sigma 2$) of the dispersion value $\sigma 1$ to the dispersion value $\sigma 2$ was measured on each transparent conductive layer according to the following measuring method. The results are shown in following Table 1.

In addition, the surface electric resistance and haze were measured according to the following measuring methods, and the results are shown in following Table 1. Furthermore, for evaluating the adhesiveness between the PET film and the transparent conductive layer and the strength of the transparent conductive layer, a 90° peel test was carried out according to the following method, and the results are shown in following Table 1.

Measuring Method of the Ratio ($\sigma 1/\sigma 2$)

A squared tracing paper is placed on the cross sectional photograph of 100 thousand magnifications of the transparent conductive film without deviation, and the end surfaces at which the conductive fine particles at the interface side and at the surface side of the transparent conductive layer are aligned are each traced to obtain lines L1 and L2 showing aligning states of the conductive fine particles. By the way, at the part where the conductive fine particles are apparently lacked, a line segment is obtained by extrapolating from both side of the lacking part. Then, base line B1 and B2 are drawn at about 1 cm apart from each of the lines L1 and L2 showing aligning states of the conductive fine particles. And, the distances between the base line B1 and the line L1 and the distances between the base line B2 and the line L2 are each measured at an interval of 2 mm (the measuring length is 10 cm). The average squares of the differences between the average value of the measured values and each measured value are each defined as the dispersion values σ1, σ2, and the ratio (σ1/σ2) is calculated.

Measurement of Surface Electric Resistance

The transparent conductive film where a transparent conductive layer is formed was cut into a piece having a size of 50 mm×50 mm, and the electric resistance is measured by applying terminal bars of a circuit tester to two corner points which are diagonally positioned.

Measurement of Haze

It is measured using a haze meter (TC-H3 DPK model manufactured by Tokyo Densyoku K.K.).

90° Peel test

A double-stick tape is installed to the surface of the PET film of the transparent conductive film opposite to the surface to which the transparent conductive layer is formed. The resulting film is cut into a piece having a size of 25 mm×100 mm to be a sample, which is then adhered to a stainless plate. Successively, a cellophane tape is installed at both sides of the test sample (at the sides having a length of 25 mm) so as to prevent peeling of the test sample. Thereafter, a cellophane tape (width 12 mm, No. 29 manufactured by Nitto Denko K.K.) is installed to the surface of the transparent conductive layer of the test sample so as to be parallel to the long side of the test sample. The length of the cellophane tape installed to the test sample is 50 mm. Then, the uninstalled end of the cellophane tape is fixed to a chuck and the sample is set so that the angle between the installed surface and uninstalled surface of the cellophane tape becomes 90°. The cellophane tape is peeled off by pulling the tape at a rate of 100 mm/minute. At that time, the stainless steel plate is moved at the same rate as the peeling rate of the cellophane tape so that the angle between the uninstalled surface of the cellophane tape and the surface of the test sample is kept 90 °. After the test, the conditions of the coated film is examined to be evaluated in accordance with the following evaluation standard.

○: the coated film is not broken and no peeling from the PET film is observed.

×: the coated film is broken and part of the coated film is attached to the cellophane tape.

TABLE 1

| Transparent conductive film | Thickness of transparent conductive layer (μm) | Compressing pressure (N/mm²) | σ1/σ2 | Electric resistance | Haze (%) | 90° peel test |
|---|---|---|---|---|---|---|
| Sample 1 | 1.7 | 56 | 1.25 | 254 kΩ | 4.2 | ○ |
| Sample 2 | 1.5 | 157 | 1.34 | 112 kΩ | 3.5 | ○ |
| Sample 3 | 1.4 | 347 | 1.51 | 58 KΩ | 3.1 | ○ |
| Sample 4 | 1.3 | 500 | 1.72 | 52 kΩ | 2.9 | ○ |
| Sample 5 | 1.2 | 1000 | 1.83 | 45 kΩ | 2.6 | ○ |
| Sample 6 | 1.9 | 13 | 1.05 | 845 kΩ | 5.2 | X |
| Sample 7 | 1.4 | 330 | 0.98 | 7.2 MΩ | 2.3 | ○ |
| Sample 8 | 1.3 | 347 | 0.97 | 57 kΩ | 3.2 | X |

As shown in Table 1, it was confirmed that the transparent conductive films of the present invention comprising a transparent conductive layer having the ratio (σ1/σ2) of the dispersion values σ1, σ2 of 1.2 to 1.85 (Samples 1 to 5) had all a sufficiently low electric resistance and a low haze, i.e., a sufficient transparency. Also, these transparent conductive films exhibited a good adhesiveness of the transparent conductive layer to the PET film although the transparent conductive layer contained no resin.

To the contrary, the transparent conductive films comprising the transparent conductive layer having the ratio (σ1/σ2) of the dispersion values σ1, σ2 of less than 1.2 (Samples 6, 8) exhibited a bad adhesiveness of the transparent conductive layer to the PET film irrespective of the electric resistance of the transparent conductive layer.

Moreover, since the transparent conductive film comprising the transparent conductive layer having the ratio (σ1/σ2) of the dispersion values σ1, σ2 of less than 1.2 (Sample 7) contained a large amount of the resin in the transparent conductive layer, the adhesiveness of the transparent conductive layer to the PET film was good but the electric resistance of the transparent conductive layer was high.

EXAMPLE 2

First, 300 parts by weight of methanol was added to 100 parts by weight of ITO fine particles having average primary particle size of 20 nm (SUFP-HX manufactured by Sumitomo Metal Mining Co. Ltd.), and the particles were dispersed in a dispersing machine using zirconia beads as media to prepare a conductive coating composition.

Next, the above conductive coating composition was applied onto a PET film having a thickness of 50 μm using a bar coater and dried at 50° C. Hereinafter, the resulting film was referred to as a pre-compression ITO film. The thickness of the ITO-containing coated film was 1.9 μm.

Then, the pre-compression ITO film was interposed between metal rolls (the roll surfaces were subjected to a hard chromium-plating treatment), and was compressed by rotating the rolls at room temperature (23° C.) at a feeding rate of 5 m/minute. The compressing pressures per unit area at the compressing step were set differently as shown in following Table 2. Transparent conductive films (Samples I to VI comprising each transparent conductive layer were obtained by compressing the ITO films in such a manner.

Moreover, 100 parts by weight of the same ITO powder as above was added to a resin solution obtained by dissolving 100 parts by weight of an acrylic resin solution MT408-42 (non-volatile component concentration of 50%) manufactured by Taisei Kako K.K. as a resin into 400 parts by weight of a methyl ethyl ketone/toluene/cyclohexanone (1:1:1) mixed solution, and the powder was dispersed in a dispersing machine using zirconia beads as media to prepare a conductive coating composition. Using the conductive coating composition, a transparent conductive film (Sample VII) was obtained in a similar manner to the above transparent conductive films (Samples I to VI). However, the compressing pressure per unit area at the compressing step was set as shown in following Table 2.

Furthermore, a transparent conductive film (Sample VIII) was obtained in a similar manner to the above transparent conductive film (Sample III: no resin was used) with the exception that a silicon resin hard coat material of a thickness of 3 μm (Tosguard 510 manufactured by GE. Toshiba silicone K.K.) placed on the above PET film was used as a transparent support.

For the transparent conductive films (Samples I to VIII), the thickness of the transparent conductive layer, the ratio (σ1/σ2) of the dispersion values σ1, σ2, surface electric resistance, and haze were measured in a similar manner to Example 1 and the results are shown in following Table 2.

Furthermore, a 90° peel test was carried out in a similar manner to Example 1, and the results are shown in following Table 2.

TABLE 2

| Transparent conductive film | Thickness of transparent conductive layer (μm) | Compressing pressure (N/mm$^2$) | σ1/σ2 | Electric resistance | Haze (%) | 90° peel test |
|---|---|---|---|---|---|---|
| Sample I | 1.4 | 56 | 1.23 | 4.8 kΩ | 3.3 | ○ |
| Sample II | 1.3 | 157 | 1.33 | 3.2 kΩ | 2.7 | ○ |
| Sample III | 1.2 | 347 | 1.48 | 1.1 kΩ | 2.2 | ○ |
| Sample IV | 1.2 | 500 | 1.72 | 0.9 kΩ | 2.0 | ○ |
| Sample V | 1.1 | 1000 | 1.81 | 0.8 kΩ | 1.8 | ○ |
| Sample VI | 1.7 | 13 | 1.02 | 18.2 kΩ | 4.3 | X |
| Sample VII | 1.3 | 330 | 0.98 | 160 kΩ | 2.1 | ○ |
| Sample VIII | 1.2 | 347 | 0.96 | 1.0 kΩ | 2.2 | X |

As shown in Table 2, it was confirmed that the transparent conductive films of the present invention comprising a transparent conductive layer having the ratio (σ1/σ2) of the dispersion values σ1, σ2 of 1.2 to 1.85 (Samples I to V) had all a sufficiently low electric resistance and a low haze, i.e., a sufficient transparency. Also, these transparent conductive films exhibited a good adhesiveness of the transparent conductive layer to the transparent support although the transparent conductive layer contained no resin.

To the contrary, the transparent conductive films comprising the transparent conductive layer having the ratio (σ1/σ2) of the dispersion values σ1, σ2 of less than 1.2 (Samples VI, VIII) exhibited a bad adhesiveness of the transparent conductive layer to the transparent support.

Moreover, since the transparent conductive film comprising the transparent conductive layer having the ratio (σ1/σ2) of the dispersion values σ1, σ2 of less than 1.2 (Sample VII) contained a large amount of a resin in the transparent conductive layer, the adhesiveness of the transparent conductive layer toward the PET film was good but the electric resistance of the transparent conductive layer was high.

What is claimed is:

1. A functional film, comprising:
   a transparent resin film as a support; and
   a functional layer on at least one surface of said transparent resin film;
   wherein the said functional layer comprises functional fine particles; and
   wherein a ratio (σ1/σ2) between
   a) a dispersion value (σ2) obtainable from an alignment of said functional fine particles at a front surface of said functional layer, and
   b) a dispersion value (σ1) obtainable from the alignment of said functional fine particles at an opposite surface of said functional layer is from 1.2 to 1.85.
2. The functional film according to claim 1, wherein said functional fine particles are conductive fine particles.
3. The functional film according to claim 2, wherein said conductive fine particles have an average primary particle size of from 5 to 50 nm.
4. The functional film according to claim 2, wherein said functional layer has a thickness of from 0.5 to 5 μm.
5. The functional film according to claim 2, wherein said functional layer comprises a resin in an amount of from 3.7 by volume or less when the volume of said conductive fine particles is regarded as 100.
6. The functional film according to claim 5, wherein said resin is a thermoplastic resin.
7. The functional film according to claim 5, wherein said resin is selected from the group consisting of fluorine polymers, silicone resins, acrylic resins, polyvinyl alcohol, carboxymethyl cellulose, hydroxypropyl cellulose, regenerated cellulose diacetyl cellulose, polyvinyl chloride, polyvinyl pyrrolidone, polyethylene, polypropylene, SBR, polybutadiene, polyethylene oxide and mixtures thereof.
8. The functional film according to claim 2, wherein said conductive fine particles are inorganic conductive fine particles selected from the group consisting of tin oxide, indium oxide, zinc oxide, cadmium oxide, antimony doped tin oxide, fluorine-doped tin oxide, tin-doped indium oxide and aluminum-doped zinc oxide.
9. The functional film according to claim 2, wherein said functional layer comprises no resin.
10. The functional film according to claim 2, wherein said functional layer is a transparent conductive layer.
11. The functional film according to claim 1, wherein said transparent resin film comprises a resin selected from the group consisting of fluorine polymers, silicone resins, acrylic resins, polyvinyl alcohol, carboxymethyl cellulose, hydroxypropyl cellulose, regenerated cellulose diacetyl cellulose, polyvinyl chloride, polyvinyl pyrrolidone, polyethylene, polypropylene, SBR, polybutadiene, polyethylene oxide and mixtures thereof.
12. The functional film according to claim 1, wherein said support has a haze value of 0.5 to 5%.
13. The functional film according to claim 1, wherein said functional film is a conductive film, a magnetic film, a ferromagnetic film, a dielectric film, a ferroelectric film, an electrochromic film, an electroluminescence film, an insulating film, a light-absorption film, a light-selective absorption film, a reflection film, an antireflection film or catalyst film.
14. The functional film according to claim 1, wherein said functional film comprises γ-$Fe_2O_3$, $Fe_3O_4$, Co—$FeO_x$, Ba ferrite, or a ferromagnetic alloy powder comprising α-Fe, Fe—Co, Fe—Ni, Fe—Co—Ni, Co or Co—Ni.
15. The functional film according to claim 1, wherein said functional film comprises a substance selected from the group consisting of magnesium titanate, barium titanate, strontium titanate, lead titanate, lead zirconate titanate, lead zirconate, lanthanum added lead zirconate titanate, magnesium silicate and a lead-containing perovskite compound.
16. The functional film according to claim 1, wherein said functional film comprises fine particles of a metal oxide selected from the group consisting of iron oxide, silicon oxide, aluminum oxide, titanium oxide, titanium dioxide, zinc oxide, zirconium oxide and tungsten oxide.
17. The functional film according to claim 1, wherein said functional fine particles comprise zinc sulfide.
18. The functional film according to claim 1, wherein said functional layer is formed on said transparent resin film by a coating method.

* * * * *